(12) United States Patent
Ji et al.

(10) Patent No.: US 9,124,369 B2
(45) Date of Patent: Sep. 1, 2015

(54) MULTI-DIRECTION VARIABLE OPTICAL TRANSCEIVER

(71) Applicant: NEC Laboratories America, Inc., Princeton, NJ (US)

(72) Inventors: Philip Nan Ji, Plainsboro, NJ (US); Ting Wang, West Windsor, NJ (US); Yoshiaki Aono, Chiba (JP)

(73) Assignees: NEC Laboratories America, Inc., Princeton, NJ (US); NEC Corporation (JP)

( * ) Notice: Subject to any disclaimer, the term of this patent is extended or adjusted under 35 U.S.C. 154(b) by 67 days.

(21) Appl. No.: 14/155,518

(22) Filed: Jan. 15, 2014

(65) Prior Publication Data

US 2014/0205286 A1    Jul. 24, 2014

Related U.S. Application Data

(60) Provisional application No. 61/754,357, filed on Jan. 18, 2013.

(51) Int. Cl.
*H04B 10/40* (2013.01)
*H04B 10/50* (2013.01)
*H04J 14/02* (2006.01)
*H04Q 11/00* (2006.01)

(52) U.S. Cl.
CPC .............. *H04B 10/40* (2013.01); *H04B 10/506* (2013.01); *H04J 14/0298* (2013.01); *H04Q 11/0005* (2013.01); *H04Q 2011/0016* (2013.01)

(58) Field of Classification Search
None
See application file for complete search history.

(56) References Cited

U.S. PATENT DOCUMENTS

2004/0028406 A1* 2/2004 Bortz et al. ............... 398/49

* cited by examiner

*Primary Examiner* — Darren E Wolf
(74) *Attorney, Agent, or Firm* — Joseph Kolodka

(57) ABSTRACT

An optical transceiver including a multi-direction variable transmitter including multiple outputs with different subcarriers being directed to different ones of the outputs to go to different directions in a network, and a multi-direction variable receiver for receiving multiple inputs thereby enabling transmission direction in a network with the transceiver at subcarrier granularity and avoiding entire super-channel granularity and enabling unused subcarriers to be utilized for traffic in other directions or destinations and making switching granularity finer for flexibility in the network.

14 Claims, 5 Drawing Sheets

MULTI-DIRECTION VARIABLE OPTICAL TRANSCEIVER

RELATED APPLICATION INFORMATION

This application claims priority to provisional application No. 61/754,357, entitled "Multi-Direction Variable Optical Transceiver", filed Jan. 18, 2013, the contents thereof are incorporated herein by reference

BACKGROUND OF THE INVENTION

The present invention relates generally to optical networks, and more particularly, to a multi-direction variable optical transceiver.

The following prior documents referenced in the background discussion, not material to patentability of the claimed invention, nevertheless provide additional information.
Super-Channel Experiment:
- [Xia1] T. J. Xia, G. A. Wellbrock, et al., "Field Experiment with Mixed Line-Rate Transmission (112-Gb/s, 450-Gb/s, and 1.15-Tb/s) over 3,560 km of Installed Fiber Using Filterless Coherent Receiver and EDFAs Only", Proc. OFC-NFOEC, paper PDPA3, 2011.
- [Xia2] T. J. Xia, G. A. Wellbrock, et al., "10,000-km Enhanced Long-Haul Transmission of 1.15-Tb/s Super-channel using SSMF only", Proc. OECC, paper PDP-4, 2011.
- [Huang1] Y.-K. Huang, M.-F. Huang, et al., "High-Capacity Fiber Field Trial Using Terabit/s All-Optical OFDM Superchannels With DP-QPSK and DP-8QAM/DP-QPSK Modulation", Journal of Lightwave Technology, Vol. 31, No. 4, 2013.

Variable Transmitter:
- [Huang2] Y.-K. Huang, E. Ip, et al., "Terabit/s Optical Superchannel with Flexible Modulation Format for Dynamic Distance/Route Transmission", Proceedings of OFC-NFOEC 2012, paper OM3H4, 2012.
- [Liu] L. Liu, H. Y. Choi, et al., "First Proof-of-Concept Demonstration of OpenFlow-Controlled Elastic Optical Networks Employing Flexible Transmitter/Receiver", Proceedings of PS 2012, PDP, 2012.

Multi-Tone Generation:
- [Yu] J. Yu, D. Qian, P. N. Ji, and T. Wang, "Generating a 400-Gbit/s single-channel optical signal", U.S. patent application Ser. No. 12/789,943, filed May 28, 2010. (NEC Labs IR #09017).
- [Ji] P. N. Ji, Y.-K. Huang, T. Wang, "Variable rate optical transmitter based on all-optical OFDM super-channel technology", NEC Labs IR 11033, patent application Ser. No. 13/588,425.

To meet the capacity demand, per-channel data rate in the WDM (wavelength division multiplexing) optical system has increased from 10 Gb/s to 40 Gb/s to 100 Gb/s. For 40 Gb/s and 100 Gb/s system, the conventional OOK (on-off keying) intensity modulation used in 10 Gb/s or below systems is no longer effective. New technologies, such as advanced modulation formats (such as QPSK, 8QAM, OFDM), multiplexing scheme (such as polarization multiplexing), receiving scheme (such as differential detection and coherent detection), and digital signal processing (such as chromatic dispersion compensation, fiber nonlinearity compensation, advanced error correction coding), are employed. For example, the most common technology for 100 Gb/s per channel DWDM long haul transmission system is polarization multiplexed (DP) QPSK modulation with digital coherent receiver.

As the capacity demand continues, beyond 100 Gb/s per-channel systems have also been researched and demonstrated. Those advanced technologies listed above might no longer sufficient in these systems, due to factors such as the bandwidth limitation of electronic components (such as DSP, ADC and DAC) and opto-electronic components (such as modulator, photo-detector). Optical super-channel scheme has been shown to be a good solution to solve these limitations. In an optical super-channel, instead of having a single optical carrier (such as in the 10 Gb/s, 40 Gb/s and most 100 Gb/s per-channel systems), multiple optical carriers (called subcarriers) are used. These subcarriers (also called optical tones) are usually generated from a single light source through a multi-tone generator (for example, using phase modulator or slow light laser), therefore maintain phase locked relationship. However in some broader definitions, different light sources can be used for different subcarriers.

A super-channel transceiver is used to transmit and receive optical superchannels. Similar to other optical transceivers, it consists of (1) the transmitter part, which converts multiple parallel data streams into an optical super-channel, and (2) the receiver part, which converts the received optical signal to multiple parallel data streams (FIG. 1(a)). In some implementations, the transmitter input is a single data input with higher data rate, which is then split into multiple parallel lower rate ones, and similarly the multiple data streams received by the receiver are merged into a larger rate data stream (FIG. 1(b)).

In a superchannel transmitter (such as in Ref. [Xia1], [Xia2], [Huang1]), these unmodulated optical subcarriers from multi-tone generator are modulated individually in parallel with different data, and the modulated subcarriers are then combined to form one superchannel. Additional optical or electrical signal processing, such as digital Nyquist filtering, optical shaping, etc., can be implemented on each subcarrier to obtain an almost rectangular frequency spectrum with a very small bandwidth close or equal to the Nyquist limit for inter-symbol interference-free transmission for each subcarrier and thus improve the transmission performance. FIG. 2 shows the schematic of a super-channel transmitter with a single light source and with optional DSP at each subcarrier. At the receiver, one or multiple or all subcarriers are received together, depending on the bandwidth of the photo-detector and related electronic hardware (such as DAC and DSP). If not all subcarriers are received together, the input optical signal can be split into different paths and each received by a separate receiver unit. These receiver units operate in parallel. At the input of these receiver units, there can be an optical filter to select the spectral band that need to be received, but if coherent receiver is used, the filter is optional, since the local oscillator can be used to select the spectral band of interest to be received. FIG. 3 shows a super-channel receiver consists of multiple parallel digital coherent receiver units.

Compared to individual WDM channels, a main advantage of using subcarriers is to eliminate inter-channel gap, which optimizes the bandwidth utilization.

To meet the flexibility demand, the super-channel transceiver can be designed to allow reconfiguration of various parameters, besides the regular configurable parameters such as center wavelength/frequency and power level. For example, (1) the number of subcarriers can be adjusted according to the capacity requirement and bandwidth availability; (2) the spacing between adjacent subcarriers can also be tuned dynamically; (3) the modulation format, multiplexing scheme, DSP technology, FEC (forward error correction) coding, etc. in each subcarrier can be adjusted, especially when digital transmitter is used (i.e. generate the signal electronically using DSP, convert the digital signal to analog signal, and then modulate onto an optical signal); (4) the data rate or symbol rate (also called the baud rate) of each subcarrier can be adjusted. (Some references are [Huang2], [Liu].)

These reconfiguration capability allows the user to set different channel data rate, bandwidth usage, channel characteristics, etc., so that the optical spectrum can be better utilized, transmission performance can be optimized, and cost can be minimized.

These reconfigurations can be done manually or through software controller. This type of transceiver is called variable optical transceiver here. It is a key element in software-defined optical network (SDON), which is the physical layer hardware in software-defined network (SDN), where the user can flexibly reconfigure the physical hardware using intelligent software through a common interface.

In WDM optical network application, the transceiver is a key element in a transponder, which converts signal between client (this side is called the "client side") and the WDM network (this side is called the "WDM side" or "line side"). FIG. 4 illustrates the basic structure of a transponder with super-channel transceiver, which also consists of electronic processors and the client side transceiver, which supplies the client data to the super-channel transceiver and vice versa.

The large capacity and configuration flexibility of these variable optical super-channel transceivers also bring out some practical issues:

1. The hardware might be over-provisioning: These variable optical transceivers are designed to accommodate the maximum possible channel capacity, but often they are not stretched to the maximum, but running at some intermediate capacities. This makes the hardware usage below optimum. Also, in an optical transponder, the processor and the client side also need to have hardware to support the maximum capacity, but also often under-utilized. For example, if a transponder contains a variable optical super-channel transceiver with up to 10 subcarriers with maximum per-subcarrier capacity of 100 Gb/s, this transponder has the maximum capacity of 1 Tb/s per channel at the WDM side (also called the line side), it will also have the electronic processor to process 1 Tb/s data, as well as a client side hardware to supply 1 Tb/s data (such as 10×100 Gb/s, or 25×40 Gb/s). Depending on the dynamic traffic condition, this variable transceiver might only transmit and receive 400 Gb/s data at some moment (using only 4 subcarriers), that means that 60% of the transmitter and receiver capability is not utilized, and similarly 60% of the processing power and 60% of the client side hardware are not utilized at this time.

2. Coarse switching granularity: In the optical transport network, each super-channel is switched as one unit during transmission and optical switching, until it is converted to electrical signal for regeneration or data processing. Therefore for switching granularity is the entire super-channel capacity, which is often beyond 100 Gb/s, up to several Tb/s. This actually reduces the flexibility in the bandwidth utilization.

Accordingly, there is a need for a variable optical transceiver that overcomes limitations of prior teachings to accommodate increasingly dynamic global data traffic over optical transport networks.

BRIEF SUMMARY OF THE INVENTION

The present invention is directed to an optical transceiver including a multi-direction variable transmitter; and a multi-direction variable receiver, the transmitter including multiple outputs with different subcarriers being directed to different ones of the outputs to go to different directions in a network, the receiver including receiving multiple inputs, thereby enabling transmission direction in a network with the transceiver at subcarrier granularity and avoiding entire super-channel granularity and enabling unused subcarriers to be utilized for traffic in other directions or destinations and making switching granularity finer for flexibility in the network.

In an alternative expression of the invention, a method by a transceiver in an optical network includes a multi-direction variable transmitter with multiple outputs and different subcarriers for directing different ones of the outputs to go to different directions in the network, and a multi-direction variable receiver for receiving multiple input, for enabling transmission direction in the network with the transceiver at subcarrier granularity and avoiding entire super-channel granularity and for enabling unused subcarriers to be utilized for traffic in other directions or destinations and making switching granularity finer for flexibility in the network.

These and other advantages of the invention will be apparent to those of ordinary skill in the art by reference to the following detailed description and the accompanying drawings.

DETAILED DESCRIPTION

The present invention departs from the "norm" that each super-channel transceiver (and thus each WDM transponder) has only one output at the WDM side, instead we design multiple outputs for each transceiver. Different subcarriers can be directed to different outputs to go to different directions in the network. Similarly, this new super-channel transceiver (and thus the WDM transponder) can receive multiple inputs from the WDM side. As a result, the transmission direction can be selected at subcarrier granularity and not the entire super-channel granularity. With the invention, by adding this feature, the unused subcarriers can be utilized for traffic in other directions/destinations, and the switching granularity can be finer, which brings better flexibility in the network.

Figure 5:
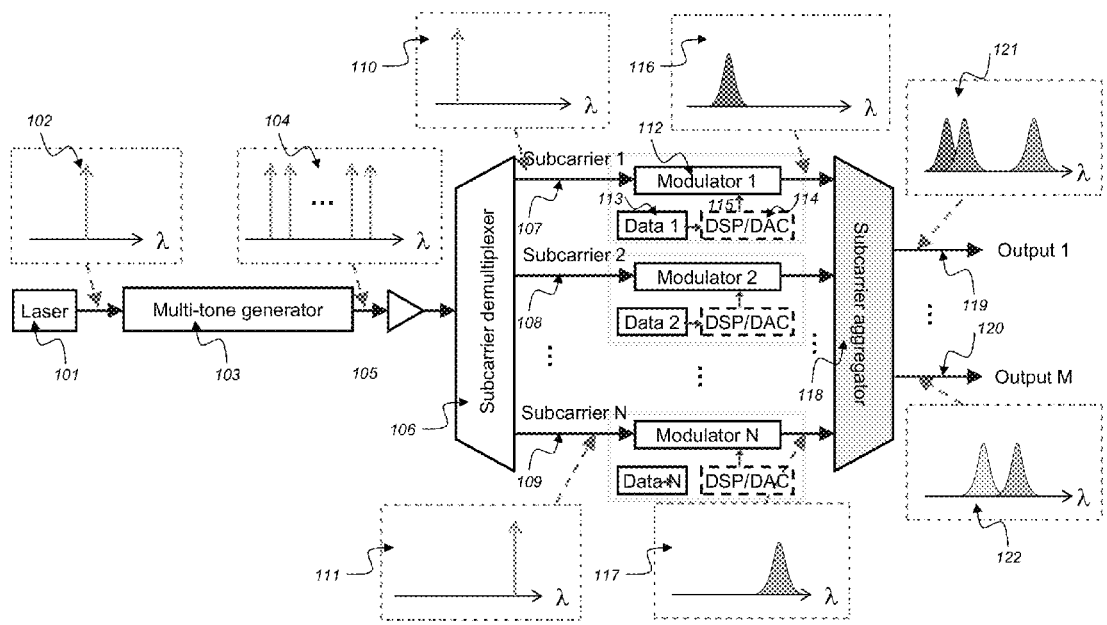
FIG. 5 is a diagram of an exemplary multi-direction super-channel transmitter in accordance with the invention.

FIG. 5 shows the proposed multi-direction variable optical transmitter based on super-channel technology. In this illustration, super-channel transmitter with single light source is used. The front part of this variable transmitter is the same as the current variable super-channel transmitter. The source laser (101) outputs a continuous wave (CW) laser light (102), which is usually tunable. The laser output goes through a multi-tone generator (103) to generate multiple tones (104). This multi-tone generator can be constructed using modulators [Yu, Ji] or slow light laser. One or multiple optical amplifiers (such as 105) can be used in various locations of the optical path to boost the signal power. The multiple optical tones are demultiplexed into individual outputs (107-109) through a subcarrier demultiplexer (106), each containing one different subcarrier (e.g. 110, 111). Each of these subcarrier is modulated individually by a modulator (e.g. 112), which applies the data (e.g. 113) onto the optical subcarrier. For analog transmitter, the modulation format can be adjusted by reconfiguring the modulator setup (such as turning on and off individual modulation stages to switch among BPSK, QPSK, 8PSK modulation formats). For digital transmitter, which is the likely technology for variable transmitter, the data (113) is processed by a digital signal processor (e.g. 114), which sets the modulation format and applies advanced processing (e.g. digital Nyquist filtering, impairment pre-compensation, . . . ), then converted from digital format to analog format by a DAC (114) and applies to the modulator. Even though only one arrow is shown (e.g. 115), usually there are multiple data streams are fed onto each modulator, since multiple modulation dimensions can be utilized simultaneously (such as phase, amplitude, polarization . . . ). The modulation signals (e.g. 116, 117) are sent to a subcarrier aggregator (118), which consists of N inputs and M outputs. The subcarrier aggregator is a novel device. Its function is to direct each modulated subcarrier to respective output ports, and to combine multiple subcarriers at each output port. After passing through the subcarrier aggregator, each output port (e.g. 119 and 120) will have super-channel signal with different subcarrier arrangements (e.g. 121 and 122). These different outputs are sent to different directions in the WDM network. In this variable optical transmitter, not only the number of subcarriers and the configuration in each subcarrier (e.g. modulation format, DSP processing . . . ) can be changed, the output of each subcarrier can also be changed.

Figure 1:
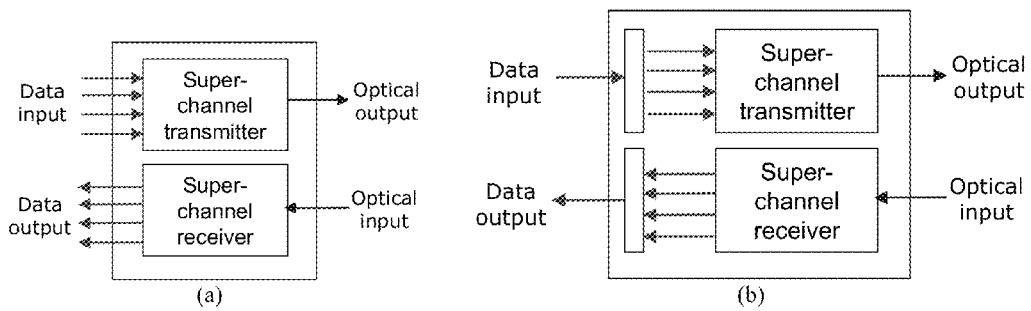
FIG. 1 is diagram of a known optical super-channel transceiver.
Figure 2:
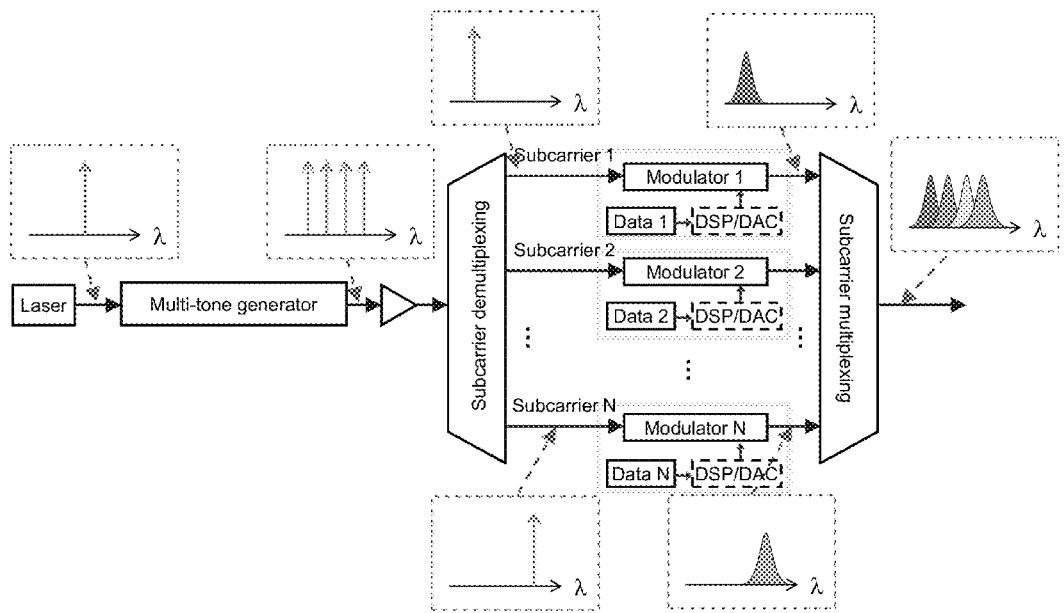
FIG. 2 is a diagram of a known super channel transmitter with single light source.
Figure 3:
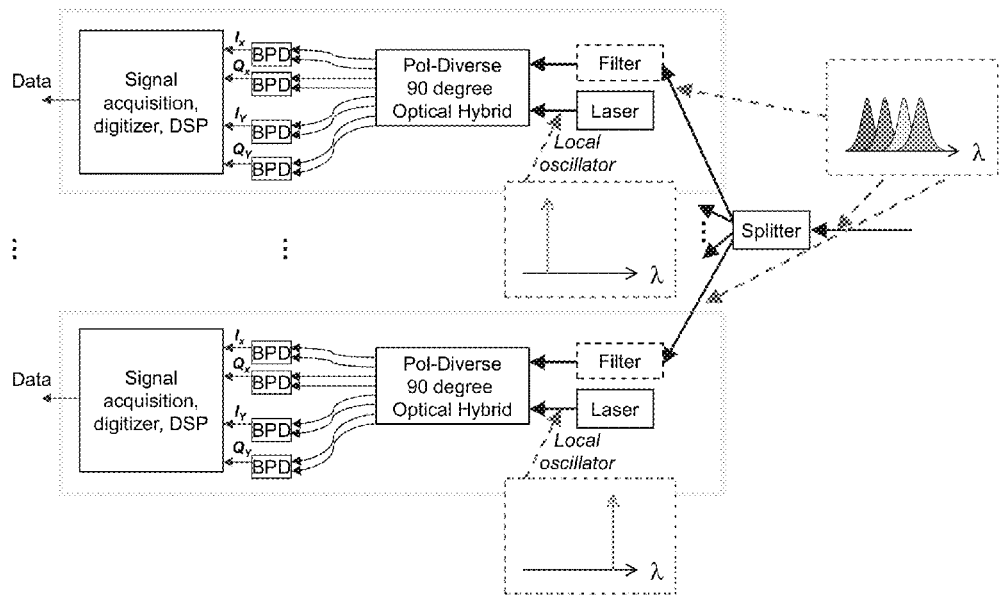
FIG. 3 is a diagram of a known super channel receiver with multiple parallel digital coherent receiver units.
Figure 4:
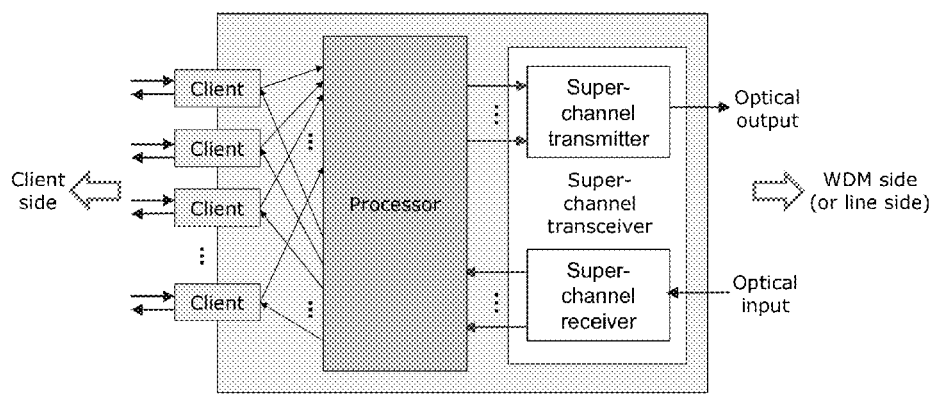
FIG. 4 is a diagram of a known WDM transponder with super-channel transceiver.
Figure 6:
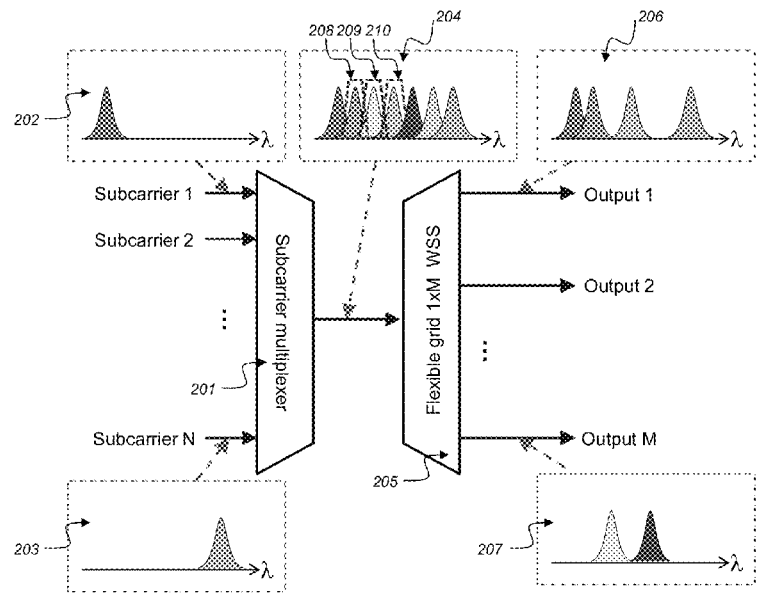
FIG. 6 is a diagram of an exemplary subcarrier aggregator shown in FIG. 5.

There are various configurations for a subcarrier aggregator. FIG. 6 shows the first design. It consists of a subcarrier multiplexer (201, same as the existing single output super-channel transmitter, illustrated in FIG. 2, can be just optical coupler or optical multiplexer with appropriate channel spacing) which combined all modulated subcarriers (202, 203) into a super-channel (204). Then it uses a 1×M wavelength-selective switch (WSS) (205) to separate and select the output port for each subcarrier. A 1×M WSS is a commonly used optical device that can separate the optical signal into individual spectral components (usually referring to individual WDM channels, but here we refer to individual super-channel subcarriers), switching each component independently to one of the M output directions, and then combine all the spectral components at each output port. Since the subcarrier spacing is narrower than the standard WDM system and might be reconfigured, flexible grid 1×M WSS is used here. Such WSS does not have a fixed grid (e.g. 50 GHz or 100 GHz), instead allows the user to define the spectral width of individual spectral component dynamically. In this application, the WSS grid is set to the subcarrier spacing. At each of the M outputs of the flexible grid 1×M WSS, the super-channel signal for the respective output direction is formed (e.g. 206, 207). The advantage of this design is that it's very straightforward, and the number of optical device is only 2. However it has an issue: in an optical super-channel, all subcarriers are densely located together (unlike among the WDM channels), and the modulated data rate is usually up to the maximum, therefore there's none or little gap between adjacent subcarriers. Furthermore, without Nyquist filtering, these subcarriers actually overlap spectrally. Since the WSS (including the flexible grid WSS) cannot produce ideal rectangular passband profile, part of the center channel and neighboring channels' passbands will be cut by the WSS during the subcarrier switching process (even if the individual subcarrier has Nyquist filtering before entering the WSS), as illustrated by 208-210. Therefore the signal quality will be degraded by the WSS filtering effect. It will be further worsen by the potential (even if slight) mismatch of the WSS frequency and the super-channel subcarrier frequency.

Figure 7:
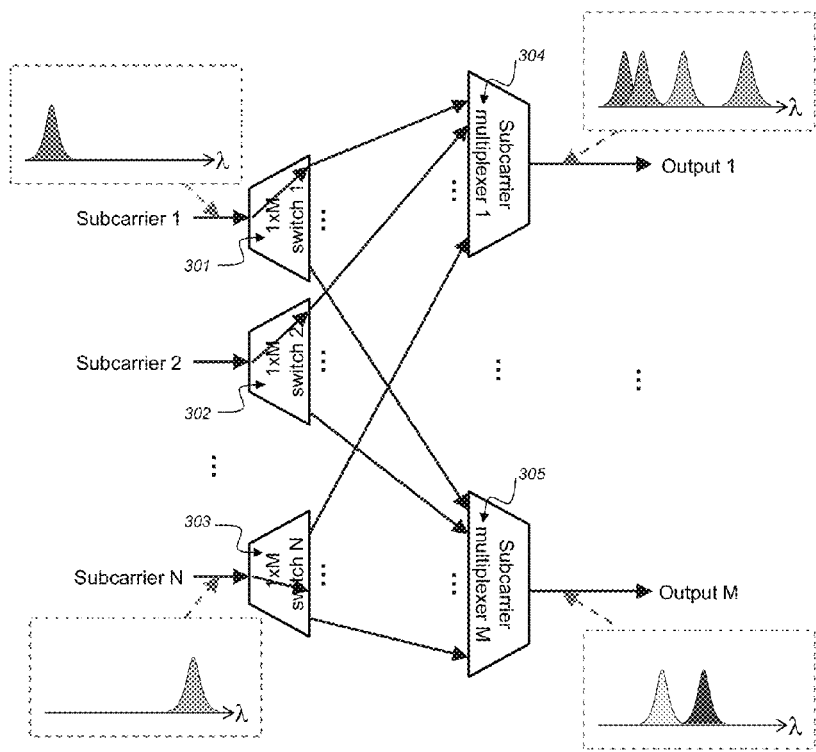
FIG. 7 is a diagram of an alternative exemplary subcarrier aggregator shown in FIG. 5.

In the second design, as illustrated in FIG. 7, the individual modulated subcarriers are not multiplexed together, but each is sent to a 1×M optical switch (e.g. 301-303). This switch sets the output port for the particular subcarrier. Altogether there are N units of 1×M switches in parallel. The output ports of these switches are connected to the input ports of respective subcarrier multiplexers (e.g. 304, 305), there are M subcarrier multiplexers in parallel. Such design overcomes the WSS filtering issue described above, however it requires large amount of optical devices (N units of 1×M optical switches, and M units of subcarrier multiplexers). With device integration technologies such as Planar Lightwave Circuit (PLC) or silicon photonic integrated circuit, it is possible to integrate these individual components together into one monolithic unit to reduce hardware size.

Figure 8:
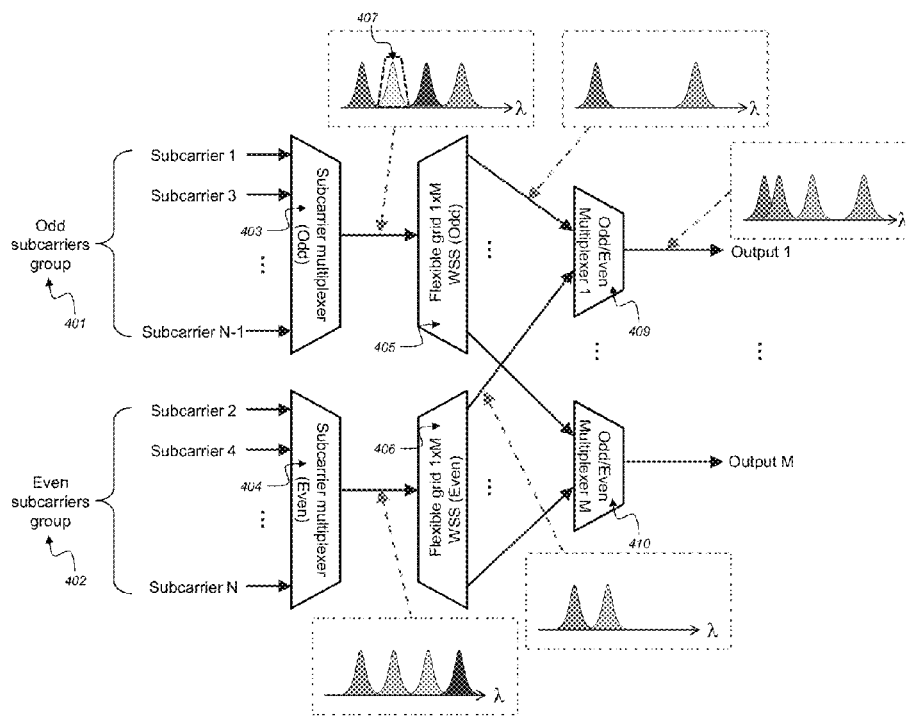
FIG. 8 is a diagram of a further alternative subcarrier aggregator shown in FIG. 5.

The third design, as illustrated in FIG. 8, has similar concept as the first design, however does not have the WSS filtering issue. This is done by separating the subcarriers into two groups, namely the odd subcarrier group (401) and the even subcarrier group (402, in the notation we assume N is an even number, which is not necessarily the case). Two separate subcarrier multiplexers (403 and 404) are used to multiplex odd channels and even channels respectively. The multiplexed odd group and even group pass through respective 1×M flexible grid WSS (405 and 406). The WSS's select the output port for each subcarrier. Because the multiplexed signal entering the WSS only contain alternative channels, the passband width of the WSS can be set to twice of the subcarrier spacing, and the passband edge of the WSS filter (407) can be set in the unused subcarrier, and thus will not cause filtering effect to the center subcarriers or its neighboring channels. The outputs of the two flexible grid 1×M WSS are connected to M units of odd/even multiplexers (e.g. 409 and 410). The $i^{th}$ port from the odd channel WSS and the $i^{th}$ port from the even channel WSS are connected to the $i^{th}$ odd/even multiplexer. These multiplexers can be just 2:1 optical couplers, or optical interleavers with the corresponding frequency spacing. This design requires more hardware than the first design, but eliminates the WSS filtering issue.

Figure 9:
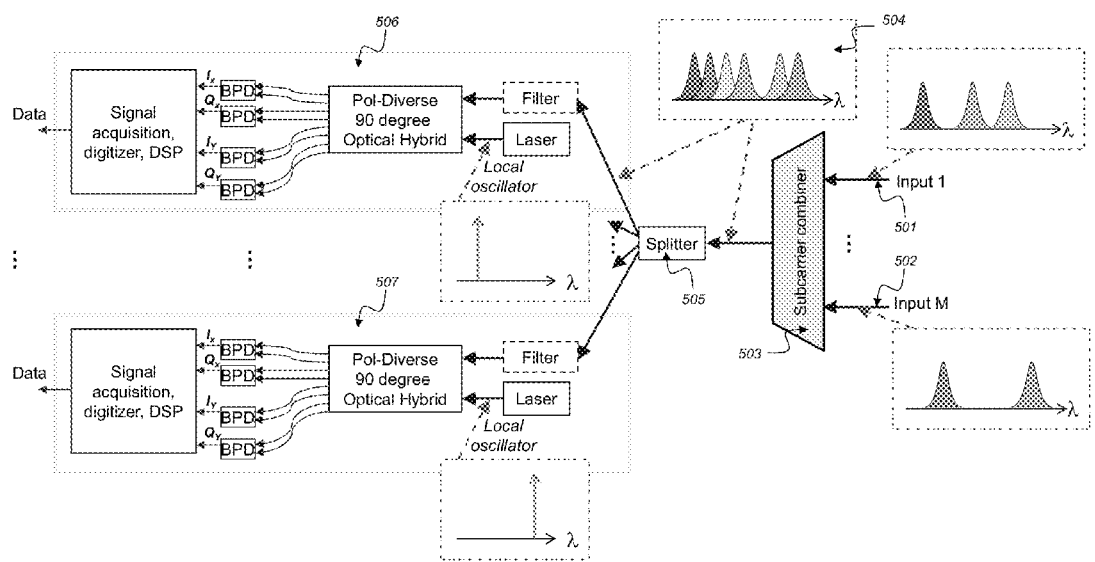
FIG. 9 is a diagram of a multi-direction variable optical receiver, in accordance with the invention.

For the multi-direction variable optical receiver, as shown in FIG. 9, there are input signals from multiple directions (e.g. 501 and 502), each carrying different combinations of super-channel subcarriers. With appropriate network control and subcarrier allocation scheme, there will not be subcarrier contention among different inputs. These multiple inputs are combined using a subcarrier combiner (503), which can be just an optical coupler, to form a super-channel (504). The remaining section is the same as the existing super-channel receiver described above. Depending on the bandwidth of the received super-channel and the receiver hardware, the signal might be split into multiple sections through an optical splitter (505) and be received by individual optical receiver units (e.g. 506 and 507). Different optical receiver can be used, such as the digital coherent receiver shown in FIG. 9.

Figure 10:
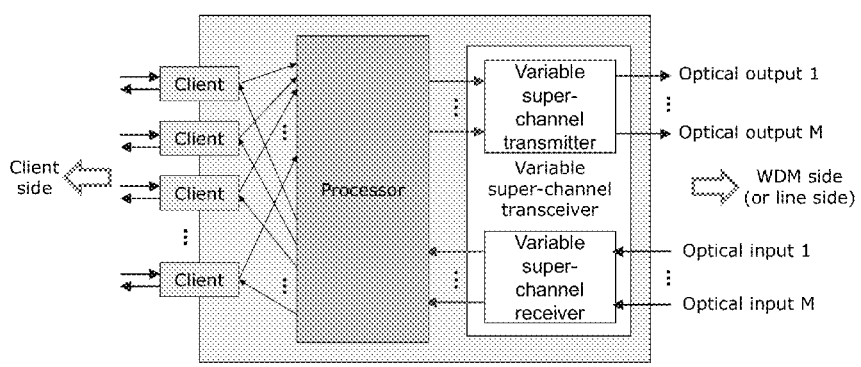
FIG. 10 is a diagram of an exemplary transponder with multi-direction variable super-channel transceiver, combining the optical transmitter and receiver detailed, in accordance with the invention.

Together, the multi-direction variable optical transmitter and the multi-direction variable optical receiver form the multi-direction variable optical transceiver. When applied in a transponder, the transponder will also have multiple inputs and multiple outputs at the WDM side, so that the signal from this transponder can be transmitted to and received from multiple directions simultaneously (FIG. 10). With intelligent processing within the transponder and in the network controller, the different client signals can communicate with different directions in the network based on the traffic requirements. For example, if the transceiver has the maximum transmission capacity of 2 Tb/s across 20 subcarriers (i.e. each subcarrier can carry maximum 100 Gb/s data), but only total of 1 Tb/s data from Clients 3-6 is required to communicate with Node A in direction 1, the variable transceiver can modulate this 1 Tb/s data onto Subcarriers 1 to 10, and the remaining subcarriers (11 to 20) can be used to transmit additional data from other clients that need to send to other directions, such as 100 Gb/s data from Client 1 can be modulated to Subcarrier 11 to go to direction 2, and 500 Gb/s data from Client 2 and 7 can be modulated to Subcarriers 16-20 to go to direction 3, etc. In this case, the processing power of the transponder, the capacity of the client side hardware, and the capacity of the super-channel transceiver, can be better utilized.

From the foregoing it can be appreciated that the features and benefits of the invention applied in the optical communication network, this invention allows the network owners to have better utilization of their hardware resources (including both the communication equipment, and the bandwidth resource), which will lead to better profitability over their asset. It also boosts the network performance since the operation can be done on a finer granularity and better flexibility.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. An optical transceiver comprising;
  a multi-direction variable transmitter, wherein the transmitter includes:
    a laser having an output;
    a multi-tone generator having an input connected to the output of the laser, and having an output producing plural subcarriers;
    a subcarrier demultiplexer having an input connected to the output of the multi-tone generator and having plural outputs, wherein the plural subcarriers are demultiplexed into single subcarriers at the outputs of the demultiplexer;
    plural modulators connected to the plural outputs of the subcarrier demultiplexer; and
    a subcarrier aggregator having plural inputs connected to the plural modulators, and having plural outputs corresponding to different destinations from the transceiver, wherein the aggregator selectively combines individual modulated subcarriers from the inputs into plural modulated subcarriers at the outputs, wherein different output have different combinations of subcarriers; and
  a multi-direction variable receiver, wherein the receiver includes:
    a subcarrier combiner including plural optical inputs corresponding to different optical signal sources, and having an output;
    a splitter having an input connected to the output of the combiner, and having plural outputs;
    plural optical receiving units, each having a input connected to a corresponding one of the splitter outputs, and having an output producing data carried on a subcarrier received at the input of the receiving unit.

2. The transceiver of claim 1, wherein the subcarrier aggregator comprises outputs that, after passing through the subcarrier aggregator, each output having a super-channel signal with different subcarrier arrangements and different outputs being sent to different directions in the network.

3. The transceiver of claim 1, wherein the subcarrier aggregator comprises the number of subcarriers and the configuration in each subcarrier being changeable and the output of each subcarrier being changeable.

4. The transceiver of claim 1, wherein the subcarrier aggregator comprises a subcarrier multiplexer for receiving multiple subcarrier inputs and coupled to a wavelength-selective switch providing the outputs of the subcarrier aggregator.

5. The transceiver of claim 1, wherein the subcarrier aggregator comprises multiple 1×M optical switches for receiving multiple subcarrier inputs and coupled to multiple 1×M optical switches in parallel with output ports being connected to input ports of respective subcarriers multiplexers in parallel.

6. The transceiver of claim 1, wherein the subcarrier aggregator comprises subcarrier multiplexers for receiving multiple subcarrier inputs separated into odd and even subcarrier groups and coupled to respective flexible grid switches which select the output port for each subcarrier.

7. The transceiver of claim 1, wherein the receiver comprises inputs for receiving input signals from multiple directions each carrying different combinations of super-channel subcarriers and a subcarrier combiner for combining the multiple ones of the inputs to form a super-channel, the receiver employing network control and subcarrier allocation that avoids contention among different ones of the inputs.

8. A method by a transceiver in an optical network comprising
  transmitting by a multi-direction variable transmitter onto plural outputs to different destinations in the network, wherein transmitting includes:
  outputting a laser signal;
  producing plural subcarriers from the laser signal;
  demultiplexing the plural subcarriers into single subcarriers on plural optical paths;
  modulating the plural subcarriers on the optical paths;
  aggregating the modulated plural subcarriers onto the plural optical paths to different destinations, wherein aggregating the subcarriers includes selectively combining individual modulated subcarriers into groups having different combinations of subcarriers;
  transmitting the different combinations of subcarriers on the plural optical paths to different destinations;
  receiving with a variable receiver, wherein receiving includes:
  receiving subcarriers from plural different optical signal sources;

combining the received subcarriers into a combined subcarrier signal;

splitting the combined subcarrier signal into plural split copies of the combined subcarrier signal;

receiving the split copies of the combined subcarriers at plural optical receiving units, producing data carried on the subcarrier signal received at the receiving units.

9. The method of claim 8, comprising after aggregating, communicating at each optical path a super-channel signal with different subcarrier arrangements and being sent to different destinations in the network.

10. The method of claim 8, wherein aggregating includes changing the number of subcarriers and the configuration in each subcarrier and changing the optical path of each subcarrier.

11. The method of claim 8, aggregating includes subcarrier multiplexing and wavelength-selective switching.

12. The method of claim 8, aggregating includes performing plural, parallel 1×M optical switching and multiplexing outputs of the 1×M optical switching into plural, parallel multiplexed signals.

13. The method of claim 8, wherein aggregating includes separating subcarriers into odd and even subcarrier groups, performing flexible grid switching of the odd subcarriers, and performing flexible grid switching of the even subcarriers.

14. The method of claim 8, wherein receiving subcarriers from plural different optical signal sources includes receiving input signals from multiple directions, each carrying different combinations of super-channel subcarriers, and combining the subcarriers to form a super-channel, and employing network control and subcarrier allocation that avoids contention among subcarriers from different from different optical signal sources.

\* \* \* \* \*